United States Patent
Saito et al.

(10) Patent No.: US 10,806,133 B2
(45) Date of Patent: Oct. 20, 2020

(54) ROTOR OF SPINNING REEL FOR FISHING AND SPINNING REEL FOR FISHING WITH THE ROTOR

(71) Applicant: Shimano Inc., Sakai, Osaka (JP)

(72) Inventors: Kei Saito, Sakai (JP); Takuji Takamatsu, Sakai (JP); Satoshi Ikebukuro, Sakai (JP); Tomoya Deguchi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 178 days.

(21) Appl. No.: 16/058,649

(22) Filed: Aug. 8, 2018

(65) Prior Publication Data

US 2019/0069532 A1    Mar. 7, 2019

(30) Foreign Application Priority Data

Sep. 5, 2017 (JP) .................................. 2017-170593

(51) Int. Cl.
*A01K 89/01* (2006.01)
(52) U.S. Cl.
CPC .............................. *A01K 89/01082* (2015.05)
(58) Field of Classification Search
CPC .......... A01K 89/01082; A01K 89/0108; A01K 89/011221
See application file for complete search history.

(56) References Cited

U.S. PATENT DOCUMENTS

| 4,463,915 A * | 8/1984 | Kaneko | A01K 89/01083 |
| | | | 242/232 |
| 5,193,762 A * | 3/1993 | Takeuchi | A01K 89/0108 |
| | | | 242/232 |
| 5,379,958 A * | 1/1995 | Takeuchi | A01K 89/0108 |
| | | | 242/232 |
| 5,820,052 A * | 10/1998 | Yamaguchi | A01K 89/01 |
| | | | 242/232 |
| 5,845,858 A * | 12/1998 | Amano | A01K 89/01 |
| | | | 242/231 |

(Continued)

FOREIGN PATENT DOCUMENTS

| EP | 0456262 A1 | 11/1991 |
| JP | 2004-141039 A | 5/2004 |
| JP | 2011-030465 A | 2/2011 |

OTHER PUBLICATIONS

Combined Search and Examination Report of the corresponding British patent application No. GB1813786.9, dated Feb. 14, 2019, 7 pp.

*Primary Examiner* — Emmanuel M Marcelo
(74) *Attorney, Agent, or Firm* — United IP Counselors, LLC (57) ABSTRACT

A rotor of a spinning reel for fishing has a cylindrical portion, a first rotor arm, a first bail support, a first coupling member, and a first cover. The cylindrical portion is mounted rotatably on a reel body. The first rotor arm extends forward radially outside the cylindrical portion. The first bail support is pivotably rotatable coupled to a tip of the first rotor arm. The first coupling member couples the first bail support to the first rotor arm and has an engaged portion. The first cover covers at least partially the first rotor arm and the first bail support and has an engaging portion that comes into engagement with the engaged portion of the first coupling member.

15 Claims, 5 Drawing Sheets

(56) References Cited

U.S. PATENT DOCUMENTS

| | | | |
|---|---|---|---|
| 2002/0148918 A1* | 10/2002 | Hirayama | A01K 89/0108 242/232 |
| 2007/0057104 A1* | 3/2007 | Kitajima | A01K 89/0108 242/232 |
| 2010/0301149 A1* | 12/2010 | Bin Ahmad | A01K 89/03 242/244 |
| 2011/0210197 A1* | 9/2011 | Sugahara | A01K 89/0108 242/231 |
| 2013/0206889 A1* | 8/2013 | Ochiai | F16J 15/3204 242/322 |
| 2013/0256438 A1* | 10/2013 | Hiraoka | A01K 89/0108 242/234 |

* cited by examiner

ROTOR OF SPINNING REEL FOR FISHING AND SPINNING REEL FOR FISHING WITH THE ROTOR

CROSS-REFERENCE TO RELATED APPLICATIONS

This application claims priority to Japanese Patent Application No. 2017-170593, filed Sep. 5, 2017. The contents of that application are herein incorporated by reference in their entirety.

BACKGROUND

Technical Field

The present disclosure relates to a rotor of a spinning reel for fishing, and a spinning reel for fishing with the rotor.

Background Information

A rotor of a spinning reel for fishing is mounted rotatably on a reel main body to guide a fishing line to a spool. The rotor has a rotor main body, a rotor arm, a bail support, and a cover. The rotor main body has a cylindrical shape and is mounted rotatably on the reel main body. The rotor arm extends forward radially outside the rotor main body. The bail support is pivotably rotatably coupled to a tip of the rotor arm. The cover is disposed so as to cover the rotor arm from the outside (see Japanese Patent Application Laid-open No. 2004-141039 and Japanese Patent Application Laid-open No. 2011-030465).

Incidentally, for example, placing the cover over a part of the bail support in order to improve the appearance of the rotor (see FIG. 3 of Japanese Patent Application Laid-open No. 2011-030465) might bring a risk of entanglement of the fishing line between the cover and the bail support.

BRIEF SUMMARY

It is an object of the present disclosure to provide a rotor of a spinning reel for fishing that is less likely to cause entanglement of a fishing line, even with an improved appearance of the rotor.

A rotor of a spinning reel for fishing according to one aspect of the present disclosure can be mounted rotatably on a reel body of a spinning reel for fishing. The rotor has a cylindrical portion, a first rotor arm, a first bail support, a first coupling member, and a first cover. The cylindrical portion is mounted rotatably on the reel body. The first rotor arm extends forward radially outside the cylindrical portion. The first bail support is pivotably rotatably coupled to a tip of the first rotor arm. The first coupling member couples the first bail support to the first rotor arm and has an engaged portion. The first cover covers at least a part of the first rotor arm and a part of the first bail support and has an engaging portion that comes into engagement with the engaged portion of the first coupling member.

In the rotor of the spinning reel for fishing, since at least a part of the first bail support is covered with the first cover, entanglement of a fishing line might occur between the first cover and the first bail support. However, when the fishing line enters between the first cover and the first bail support, the engaging portion of the first cover comes into contact with the fishing line, preventing the entry of the fishing line. Therefore, even with an improved appearance of the rotor, entanglement of the fishing line is less likely to occur.

It is preferred that the first coupling member have a pivot shaft that pivotably rotatably supports the first bail support. In this case, the first bail support can be pivotably rotatably supported by the first coupling member.

It is preferred that the engaged portion of the first coupling member be provided in a recessed manner at one end of the pivot shaft, and that the engaging portion of the first cover be a protrusion that comes into engagement with the engaged portion. In this case, the engaged portion of the first coupling member and the engaging portion of the first cover can be brought into engagement with each other by means of a simple configuration.

It is preferred that the first coupling member further have, at the one end of the pivot shaft, a head whose diameter is larger than an outer diameter of the pivot shaft. At least a part of the pivot shaft of the first coupling member is provided with a screw. The engaged portion of the first coupling member is provided in the head and configured in such a manner that a screwing tool can be locked thereto. In this case, a recessed portion or the like provided for the purpose of locking the tool can be used as the engaged portion.

It is preferred that the first cover have a cover body for covering at least a part of the first rotor arm and an extending portion for covering at least a part of the first coupling member, and that the engaging portion be provided at a tip of the extending portion. In this case, providing the engaging portion at the tip of the extending portion is less likely to cause entanglement of the fishing line between the extending portion of the first cover and the first bail support.

It is preferred that the rotor further have a complementary cover for covering a gap between the first rotor arm and the extending portion. In this case, the gap between the first rotor arm and the extending portion can be filled with the complementary cover, improving the appearance of the first rotor arm.

It is preferred that the rotor of the spinning reel for fishing further has a second rotor arm that extends forward radially outside the cylindrical portion, a second bail support that is coupled to a tip of the second rotor arm in an oscillatable manner, a second coupling member that couples the second bail support to the second rotor arm and has a engaged portion, and a second cover that covers at least a part of the second rotor arm and a part of the second bail support and has an engaging portion that comes into engagement with the engaged portion of the second coupling member.

The present disclosure can provide a rotor of a spinning reel for fishing that is less likely to cause entanglement of a fishing line, even with an improved appearance of the rotor.

DETAILED DESCRIPTION OF EMBODIMENTS

An embodiment of the present disclosure is now described hereinafter with reference to the drawings. Note that, in the following descriptions, the direction perpendicular to a central axis X of a spool 2 is referred to as a radial direction. Moreover, the direction away from the central axis X of the spool 2 is referred to the outside and the direction toward the central axis X of the spool 2 as the inside. In addition, the direction in which a fishing line is pulled out when fishing is performed indicates the front and the opposite side indicates the rear of the same. Specifically, in FIG. 1, the left-hand side is the front and the right-hand side is the rear.

Figure 1:
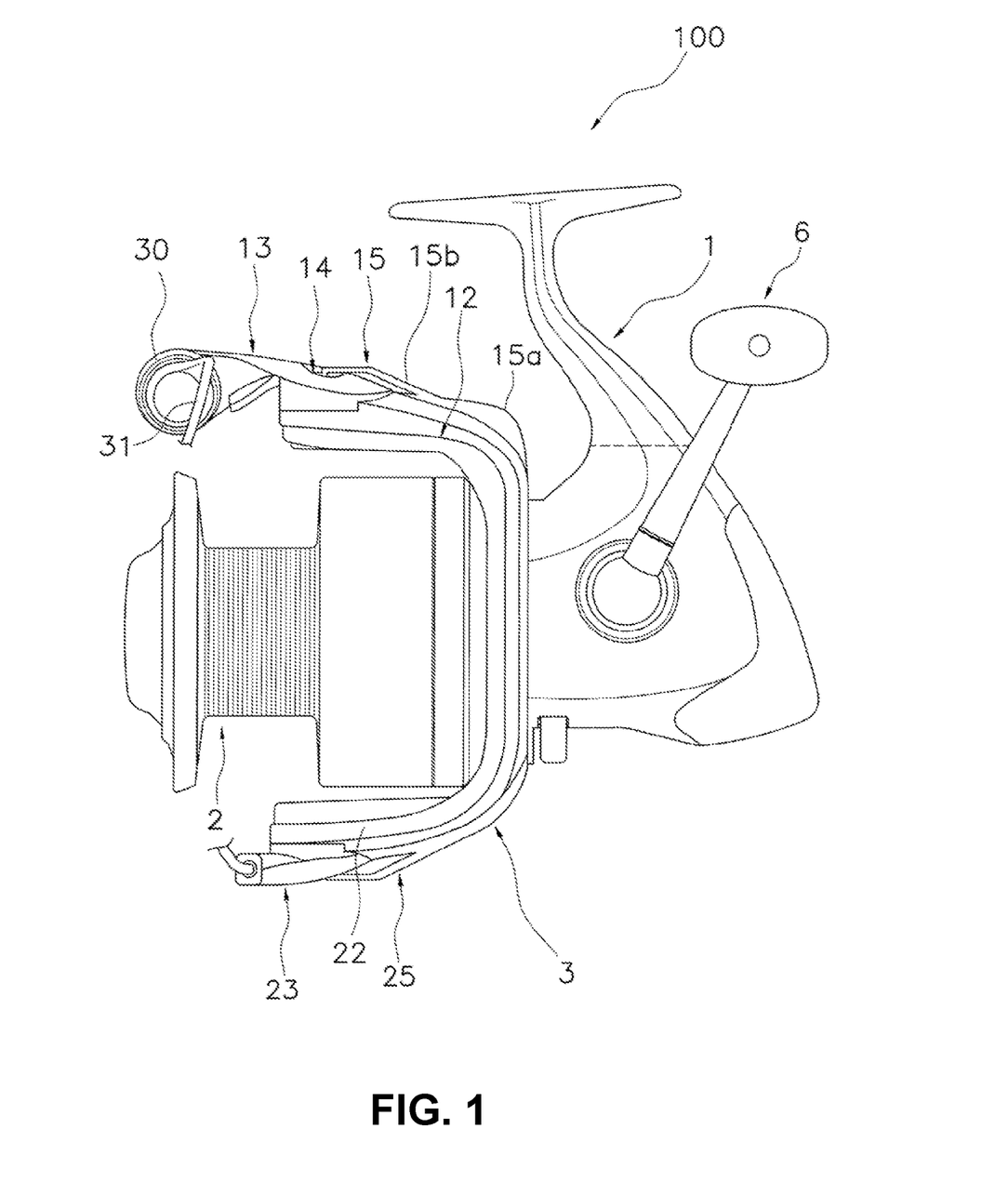
FIG. 1 is a side view of a spinning reel in which an embodiment of the present disclosure is employed.
Figure 2:
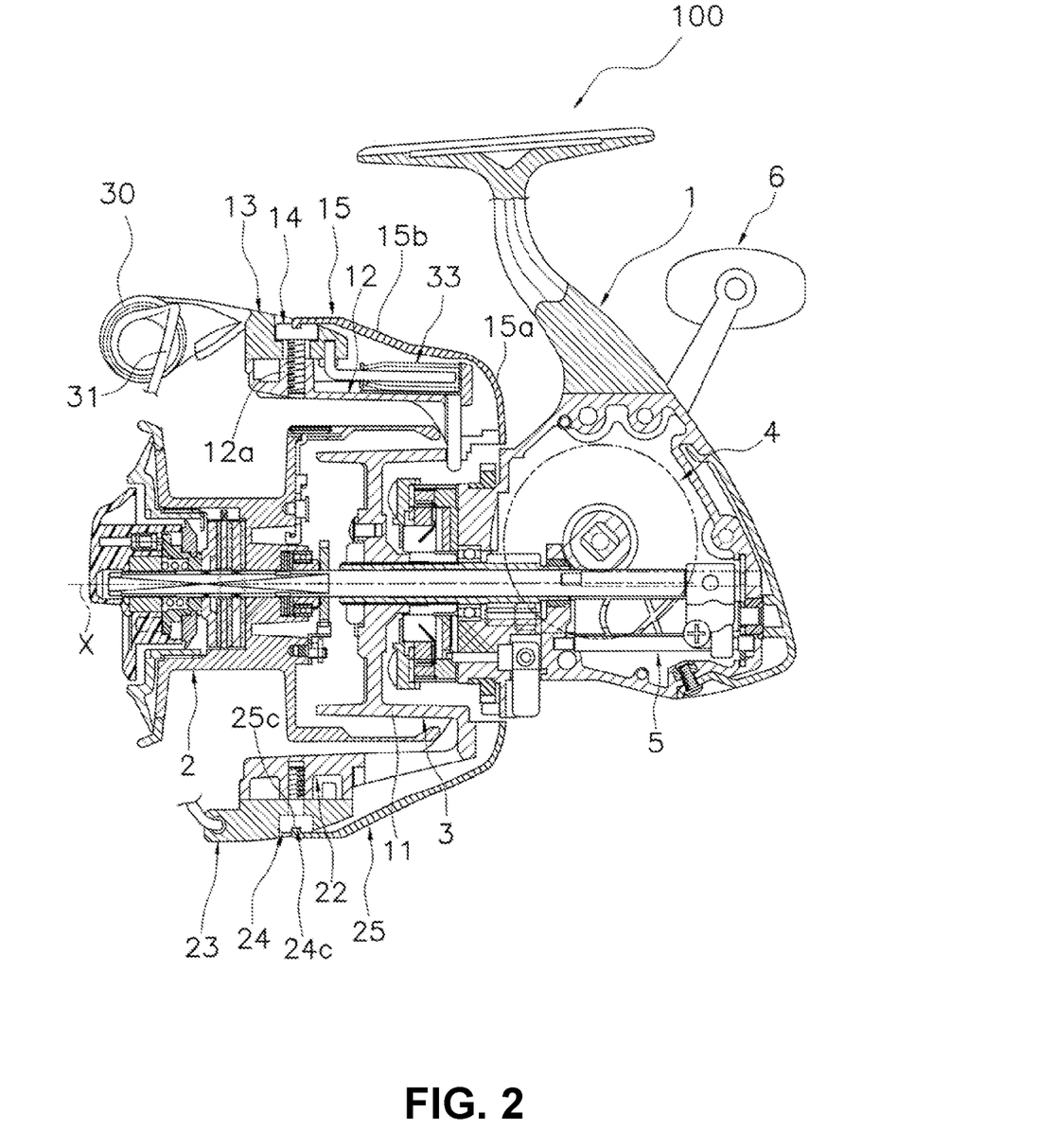
FIG. 2 is a longitudinal section view of the spinning reel in which the embodiment of the present disclosure is employed.

FIG. 1 is a side view of a spinning reel 100 in which the embodiment of the present disclosure is employed. FIG. 2 is a longitudinal section view of the spinning reel 100. The spinning reel 100 has a reel body 1, the spool 2, and a rotor 3.

As shown in FIG. 2, the reel body 1 has a gap inside thereof in which a rotor drive mechanism 4 that drives the rotor 3, an oscillating mechanism 5 for evenly winding the fishing line on the spool 2, and the like are housed.

The spool 2 is a cylindrical member. The fishing line is wound on an outer periphery of the spool 2 as a handle 6 rotates, the handle 6 being coupled rotatably to the reel body 1.

The rotor 3 is a member for winding the fishing line on the spool 2. The rotor 3 can be mounted rotatably on the reel body 1. The rotor 3 rotates about the central axis X of the spool 2 as the handle 6 rotates.

Figure 3:
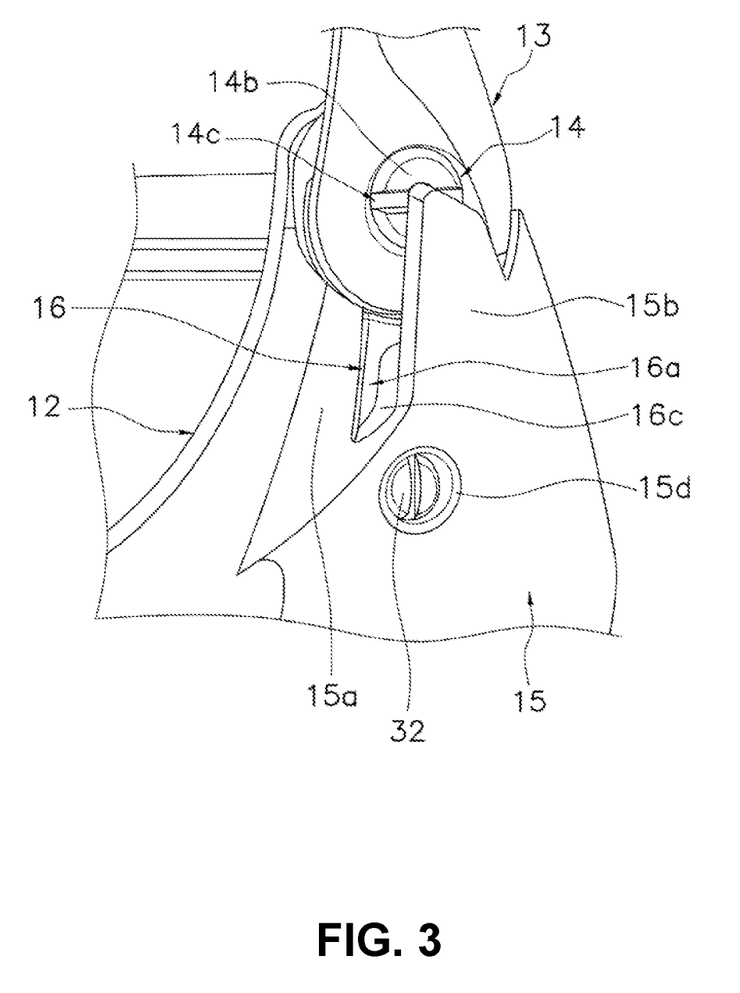
FIG. 3 is a perspective view showing the first rotor arm side of the spinning reel.

As shown in FIGS. 2 and 3, the rotor 3 has a cylindrical portion 11 that is mounted rotatably on the reel body 1, a first rotor arm 12, a first bail support 13, a first coupling member 14, a first cover 15, and a complementary cover 16. FIG. 3 is a perspective view showing the first rotor arm 12 side of the spinning reel 100. Note that the illustration of the complementary cover 16 is omitted in FIGS. 1 and 2. The rotor 3 further has a second rotor arm 22, a second bail support 23, a second coupling member 24, and a second cover 25.

The first rotor arm 12 and the second rotor arm 22 curve outward from a rear end of the cylindrical portion 11 and extend forward on the outside of the cylindrical portion 11. The first rotor arm 12 and the second rotor arm 22 are positioned so as to oppose each other with the cylindrical portion 11 therebetween.

The first rotor aim 12 has a first boss 12a protruding outward. A screw hole is formed in the first boss 12a.

The first bail support 13 is pivotably rotatably coupled to a tip of the first rotor arm 12. Similarly, the second bail support 23 is pivotably rotatably coupled to a tip of the second rotor arm 22.

A line roller 30 for guiding the fishing line to the spool 2 is mounted rotatably on a tip of the first bail support 13. The first bail support 13 and the second bail support 23 support both ends of a bail arm 31 respectively.

Figure 4:
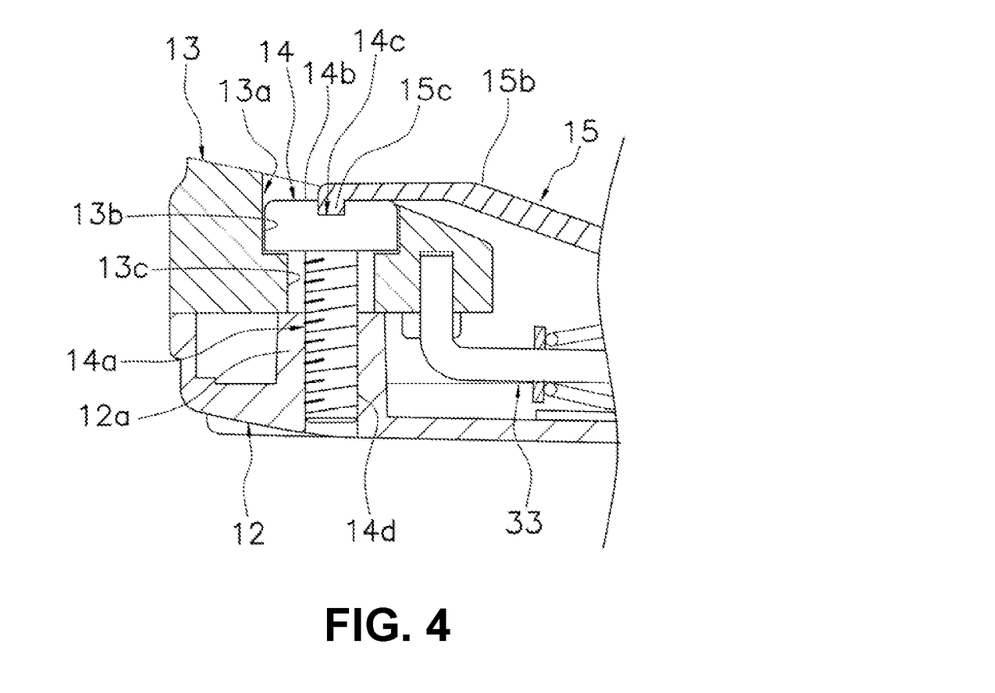
FIG. 4 is an enlarged view of the first rotor arm shown in FIG. 2.

As shown enlarged in FIG. 4, the first bail support 13 has a through hole 13a penetrating in a radial direction. The through hole 13a has a large-diameter hole 13b and a small-diameter hole 13c smaller in diameter than the large-diameter hole 13b. The large-diameter hole 13b is provided on the outside of the small-diameter hole 13c.

The first coupling member 14 couples the first bail support 13 to the first rotor arm 12. The first coupling member 14 is inserted from the outside into the through hole 13a of the first bail support 13. The first coupling member 14 has a pivot shaft 14a, a head 14b, and an engaged portion 14c.

The pivot shaft 14a penetrates the small-diameter hole 13c of the through hole 13a of the first bail support 13 to pivotably rotatably support the first bail support 13. The pivot shaft 14a has a screw 14d on at least a part of an outer periphery thereof, wherein the screw 14d is screwed into the screw hole of the first boss 12a of the first rotor arm 12. As a result, the first bail support 13 is coupled to the first rotor arm 12.

The head 14b has a circular shape and is formed at one end of the pivot shaft 14a to have a diameter larger than an outer diameter of the pivot shaft 14a. The head 14b is housed in the large-diameter hole 13b of the through hole 13a of the first bail support 13 to prevent the first bail support 13 from slipping off the first rotor arm 12. A part of the head 14b slightly protrudes from the large-diameter hole 13b toward the outside.

Figure 5:
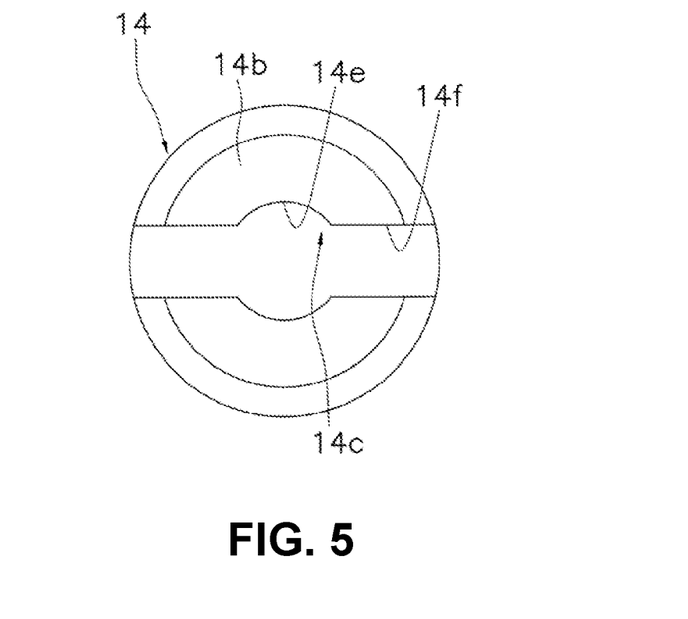
FIG. 5 is a plan view of a first coupling member.

The engaged portion 14c is provided in a recessed manner at the one end of the pivot shaft 14a. In the present embodiment, the engaged portion 14c is provided in the head 14b. Furthermore, the engaged portion 14c is configured in such a manner that a screwing tool can be locked thereto. As shown in FIG. 5, the engaged portion 14c has a circular recessed portion 14e provided at the center of the head 14b, and a straight recessed portion 14f extending straight across the circular recessed portion 14e. The diameter of the circular recessed portion 14e is larger than the width of the straight recessed portion 14f. Note that FIG. 5 is a plan view of the first coupling member 14, that is, a diagram of the head 14b as seen from the outside.

As shown in FIGS. 2 and 3, the first cover 15 is mounted on the first rotor aim 12 so as to cover at least a part of the first rotor arm 12. The first cover 15 also covers at least a part of the first bail support 13. Specifically, the first cover 15 is fixed to the first rotor arm 12 by a screw 32 in such a manner as to cover the first rotor arm 12 and the first bail support 13 from the outside. The screw 32 is inserted through a screw insertion hole 15d provided in the first cover 15, and screwed into a screw hole of the second boss 12b of the first rotor arm 12, which is described hereinafter (see FIG. 6).

As shown in FIGS. 3 and 4, the first cover 15 has a cover body 15a, an extending portion 15b, and an engaging portion 15c. The cover body 15a covers at least a part of the first rotor arm 12 from the outside. In the present embodiment, the cover body 15a extends from a rear end of the first rotor arm 12 to a position in the vicinity of an outer edge of the first bail support 13 and is connected smoothly to the first bail support 13 (see FIGS. 1 and 3). An internal gap between the cover body 15a and the first rotor arm 12 is provided with a well-known bail reversing mechanism 33.

The extending portion 15b is provided radially outside the cover body 15a to cover at least a part of the first bail support 13 and a part of the first coupling member 14. The extending portion 15b and the first coupling member 14 are arranged in positions that overlap each other at least partially in the radial direction. In the present embodiment, a part of the extending portion 15b that overlaps with the head 14b is in contact with the head 14b in the radial direction. The extending portion 15b curves outward from the vicinity of an intermediate portion of the cover body 15a and extends to a position covering the engaged portion 14c of the first coupling member 14. The extending portion 15b is generally in the shape of a plate and is formed to taper forward (see FIG. 3).

The extending portion 15b is provided in a section covering the first bail support 13, with a gap from the first bail support 13 in the radial direction, in such a manner as to not interfere with the oscillation of the first bail support 13.

Accordingly, contact between the extending portion 15b and the first bail support 13 can be avoided when the first bail support 13 oscillates.

As shown in FIG. 4, the engaging portion 15c comes into engagement with the engaged portion 14c of the first coupling member 14. Specifically, the engaging portion 15c is a cylindrical protrusion that protrudes inward from a tip of the extending portion 15b of the first cover 15 and comes into engagement with the circular recessed portion 14e of the engaged portion 14c. The diameter of the engaging portion 15c is larger than the width of the straight recessed portion 14f of the engaged portion 14c. Bringing the engaging portion 15c into engagement with the circular recessed portion 14e can position the extending portion 15b more accurately than when the engaging portion 15c is brought into engagement with the straight recessed portion 14f.

When the fishing line enters between the extending portion 15b and the first bail support 13, that is, between the extending portion 15b and the first coupling member 14, the engaging portion 15c can come into contact with the fishing line to prevent the entry of the fishing line. Thus, the engaging portion 15c is an example of a means for preventing entry of a fishing line between the extending portion 15b of the first cover 15 and the first bail support 13.

Figure 6:
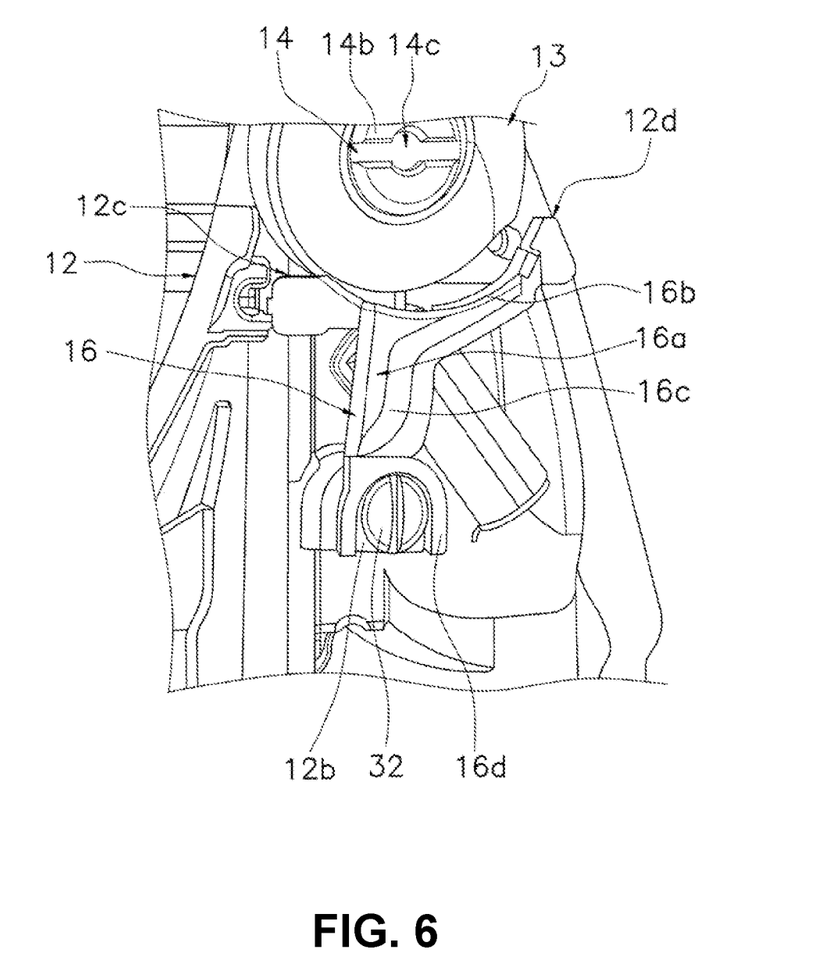
FIG. 6 is a perspective view of the first rotor arm after the first cover is removed.

FIG. 6 is a perspective view of the first rotor arm 12 after the first cover 15 is removed. As shown in FIGS. 3 and 6, the complementary cover 16 covers a gap between the first rotor arm 12 and the extending portion 15b of the first cover 15. Specifically, in a case where the extending portion 15b is provided in the first cover 15, a gap is structurally created between the extending portion 15b and the first rotor arm 12 in the radial direction. The appearance of the rotor 3 can be improved by covering this gap with the complementary cover 16. Thus, the complementary cover 16 is an example of a means for improving the appearance of the rotor 3.

The complementary cover 16 is substantially Y-shaped and has a first complementary portion 16a extending substantially in a front-rear direction and a circular arc-shaped second complementary portion 16b. The gap between the extending portion 15b and the first rotor arm 12 is covered by the first complementary portion 16a and the second complementary portion 16b.

The first complementary portion 16a has a step 16c protruding outward from the first complementary portion 16a. As shown in FIG. 3, the step 16c is formed at a position seen from the outside, with the first cover 15 being fixed to the first rotor arm 12. The first complementary portion 16a also has, at a rear end thereof, a support portion 16d supported on an outer periphery of the second boss 12b of the first rotor arm 12.

The second complementary portion 16b is shaped into a circular arc along the outer edge of the first bail support 13 at the front end side of the first complementary portion 16a. The second complementary portion 16b and the step 16c of the first complementary portion 16a are smoothly connected to each other. Both ends of the second complementary portion 16b are brought into engagement with engaging recessed portions 12c, 12d provided on the first rotor arm 12, respectively.

The complementary cover 16 is sandwiched between the first rotor arm 12 and the first cover 15 so as to be prevented from slipping off the first rotor arm 12 and wobbling.

In the present embodiment, as shown in FIGS. 1 and 2, the second bail support 23, the second coupling member 24, and the second cover 25 that are arranged on the second rotor arm 22 side have respectively the same configurations as the first bail support 13, the first coupling member 14, and the first cover 15. In other words, the second coupling member 24 has an engaged portion 24c and the second cover 25 has an engaging portion 25c coming into engagement with the engaged portion 24c. Therefore, when the fishing line enters between the second bail support 23 and the second cover 25 at the second rotor arm 22 side as well, the engaging portion 25c comes into contact with the fishing line to prevent the entry of the fishing line. Note that the detailed descriptions of the second bail support 23, the second coupling member 24, and the second cover 25 are omitted.

Other Embodiments

The above has described an embodiment of the present disclosure, but the present disclosure is not limited thereto, and various changes can be made to the present disclosure without departing from the gist of the present disclosure. In particular, a plurality of embodiments described in the present specification can be arbitrarily combined as needed.

(a) In the foregoing embodiment, the second bail support 23, the second coupling member 24, and the second cover 25 that are arranged on the second rotor arm 22 side respectively have the same configurations as the first bail support 13, the first coupling member 14, and the first cover 15, but do not have to have the same configurations. In addition, the same configurations as those of the first cover 15 and the first coupling member 14 can be provided only on the second rotor arm 22 side. Furthermore, the complementary cover 16 does not have to be provided in the rotor 3.

(b) The shapes of the engaged portion 14c and the engaging portion 15c coming into engagement with the engaged portion 14c are not limited to the ones described in the foregoing embodiment. In addition, the circular recessed portion 14e does not always have to be provided in the engaged portion 14c. The engaged portion 14c can be, for example, in a straight recessed shape or in a cross shape.

EXPLANATION OF REFERENCE NUMERALS

1 Reel body
3 Rotor
11 Cylindrical portion
12 First rotor arm
13 First bail support
14 First coupling member
14a Pivot shaft
14b Head
14c Engaged portion
14d Screw
15 First cover
15a Cover body
15b Extending portion
15c Engaging portion
16 Complementary cover
22 Second rotor arm
23 Second bail support
24 Second coupling member
24c Engaged portion
25 Second cover
25c Engaging portion
100 Spinning reel

What is claimed is:
1. A rotor of a spinning reel for fishing, the rotor capable of being mounted rotatably on a reel body of the spinning reel for fishing, the rotor comprising:
a cylindrical portion that is mounted rotatably on the reel body;

a first rotor arm that extends forward radially outside the cylindrical portion;
a first bail support that is pivotably rotatably coupled to a tip of the first rotor arm;
a first coupling member that couples the first bail support to the first rotor arm and has an engaged portion including a recess at one end of the first coupling member; and
a first cover that covers at least a part of the first rotor arm and a part of the first bail support and has an engaging portion that comes into engagement with the engaged portion of the first coupling member.

2. The rotor according to claim 1, wherein the first coupling member has a pivot shaft that pivotably rotatably supports the first bail support on the first rotor arm.

3. The rotor according to claim 2, wherein
the engaging portion of the first cover is a protrusion that comes into engagement with the recess of the engaged portion.

4. The rotor according to claim 3, wherein the first coupling member further has, at the one end of the pivot shaft, a head that has a diameter larger than an outer diameter of the pivot shaft,
at least a part of the pivot shaft of the first coupling member is provided with a screw, and
the engaged portion of the first coupling member is provided in the head and configured such that a screwing tool can be locked thereto.

5. The rotor according to claim 1, wherein the first cover member has:
a cover body for covering at least a part of the first rotor arm; and
an extending portion for covering at least a part of the first coupling member,
and the engaging portion is provided at a tip of the extending portion.

6. The rotor according to claim 5, further comprising
a complementary cover for covering a gap between the first rotor arm and the extending portion.

7. The rotor according to claim 1, further comprising:
a second rotor arm that extends forward radially outside the cylindrical portion;
a second bail support that is pivotably rotatably coupled to a tip of the second rotor arm;
a second coupling member that couples the second bail support to the second rotor arm and has an engaged portion; and
a second cover that covers at least a part of the second rotor arm and a part of the second bail support and has an engaging portion that comes into engagement with the engaged portion of the second coupling member.

8. A spinning reel for fishing, comprising:
a reel body; and
a rotor capable of being mounted rotatably on the reel body, the rotor includes
a cylindrical portion that is mounted rotatably on the reel body,
a first rotor arm that extends forward radially outside the cylindrical portion,
a first bail support that is pivotably rotatably coupled to a tip of the first rotor arm,
a first coupling member that couples the first bail support to the first rotor arm and has an engaged portion including a recess at one end of the first coupling member, and
a first cover that covers at least a part of the first rotor arm and a part of the first bail support and has an engaging portion that comes into engagement with the engaged portion of the first coupling member.

9. The spinning reel according to claim 8, wherein the first coupling member has a pivot shaft that pivotably rotatably supports the first bail support on the first rotor arm.

10. The spinning reel according to claim 9, wherein
the engaging portion of the first cover is a protrusion that comes into engagement with the recess of the engaged portion.

11. The spinning reel according to claim 10, wherein the first coupling member further has, at the one end of the pivot shaft, a head that has a diameter larger than an outer diameter of the pivot shaft,
at least a part of the pivot shaft of the first coupling member is provided with a screw, and
the engaged portion of the first coupling member is provided in the head and configured such that a screwing tool can be locked thereto.

12. The spinning reel according to claim 8, wherein the first cover has:
a cover body for covering at least a part of the first rotor arm; and
an extending portion for covering at least a part of the first coupling member, and
the engaging portion is provided at a tip of the extending portion.

13. The spinning reel according to claim 12, further comprising:
a complementary cover for covering a gap between the first rotor arm and the extending portion.

14. The spinning reel according to claim 8, further comprising:
a second rotor arm that extends forward radially outside the cylindrical portion;
a second bail support that is pivotably rotatable coupled to a tip of the second rotor arm;
a second coupling member that couples the second bail support to the second rotor arm and has an engaged portion; and
a second cover that covers at least a part of the second rotor arm and a part of the second bail support and has an engaging portion that comes into engagement with the engaged portion of the second coupling member.

15. A rotor of a spinning reel for fishing, the rotor capable of being mounted rotatably on a reel body of the spinning reel for fishing, the rotor comprising:
a cylindrical portion that is mounted rotatably on the reel body;
a first rotor arm that extends forward radially outside the cylindrical portion;
a first bail support that is pivotably rotatably coupled to a tip of the first rotor arm;
a first coupling member that couples the first bail support to the first rotor arm and has an engaged portion;
a first cover that covers at least a part of the first rotor arm and a part of the first bail support, the first cover including an extending portion for covering at least a part of the first coupling member and an engaging portion provided at a tip of the extending portion and configured to come into engagement with the engaged portion of the first coupling member; and
a complementary cover for covering a gap in a radial direction between the first rotor arm and the extending portion of the first cover.

* * * * *